No. 820,326. PATENTED MAY 8, 1906.
G. W. UPTON.
FISHING REEL.
APPLICATION FILED DEC. 30, 1903.
2 SHEETS—SHEET 1.
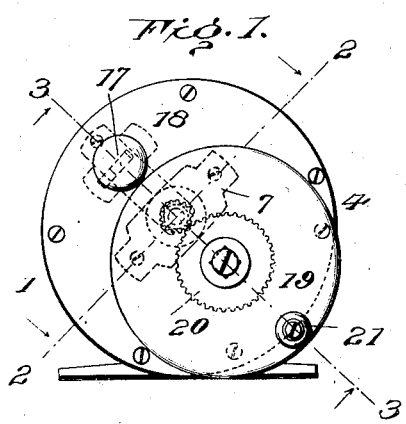
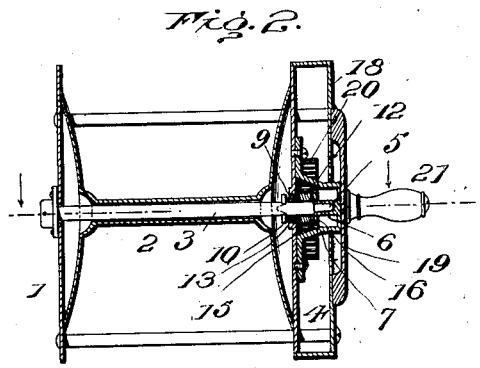
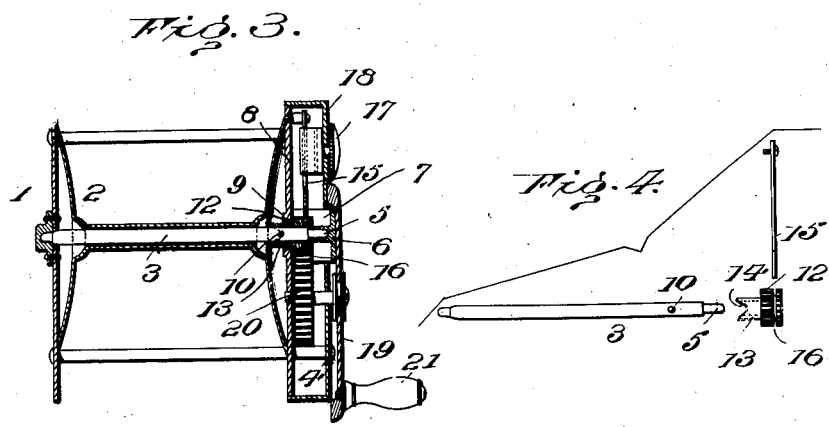
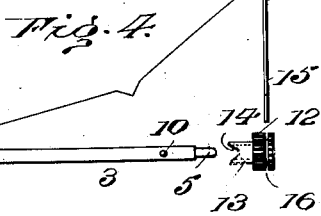
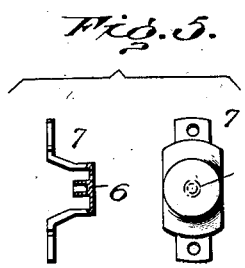
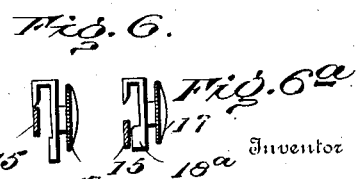
Inventor
George W. Upton
Witnesses
By
Attorney No. 820,326. PATENTED MAY 8, 1906.
G. W. UPTON.
FISHING REEL.
APPLICATION FILED DEC. 30, 1903.
2 SHEETS—SHEET 2.
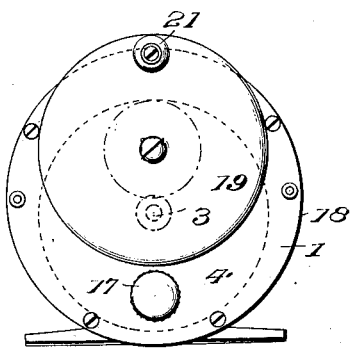
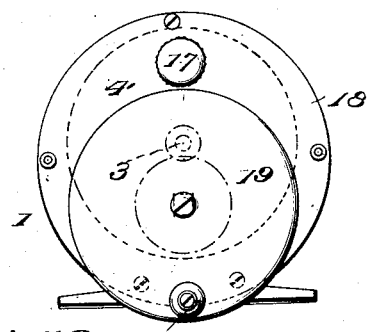
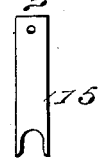
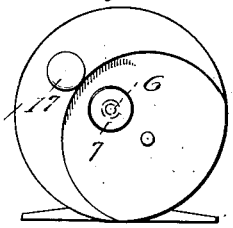
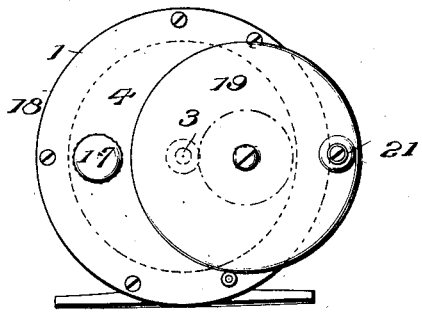
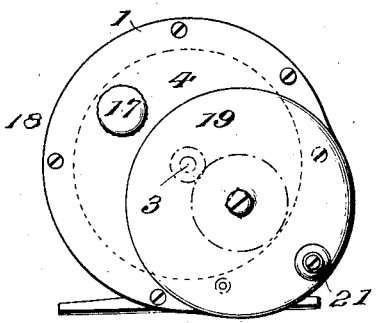
Inventor
George W. Upton they might become entangled I employ a
UNITED STATES PATENT OFFICE.

GEORGE W. UPTON, OF WARREN, OHIO.

FISHING-REEL.

No. 820,326.

Specification of Letters Patent.

Patented May 8, 1906.

Application filed December 30, 1903. Serial No. 187,198.

*To all whom it may concern:*

Be it known that I, GEORGE W. UPTON, of Warren, in the county of Trumbull and State of Ohio, have invented certain new and useful Improvements in Fishing-Reels; and I do hereby declare the following to be a full, clear, and exact description of the invention, such as will enable others skilled in the art to which it appertains to make and use the same.

The primary object of this invention is to provide an improved fishing-reel which will be applicable to both fly and bait casting.

Further objects are to provide in a reel of this character an exterior free from all projections with which the line might become entangled, to provide improved means for clutching and unclutching the gearing and the spool-shaft, to relieve the latter of torsional strain in winding, and to generally improve the construction and promote the efficiency of fishing-reels.

The invention will be hereinafter fully set forth, and particularly pointed out in the claims.

In the accompanying drawings, Figure 1 is a view in side elevation. Fig. 2 is a cross-sectional view on line 2 2, Fig. 1. Fig. 3 is a horizontal section on line 3 3, Fig. 1. Fig. 4 is a view of the sliding pinion and spool-shaft. Fig. 5 shows two views of bearing-plate. Fig. 6 is a view of the clutch-actuator. Fig. 6ª shows a modified form thereof. Figs. 7, 8, 9, and 10 are diagrammatic views showing the actuating-disk in different positions relatively to the reel-casing. Fig. 11 is a view of the pinion-shifting plate. Fig. 12 is a face view of the casing with the actuating-disk removed.

Referring to the drawings, 1 designates the casing, 2 the spool, and 3 the shaft therefor. This shaft is extended beyond the ends of the spool to fit in bearings, that end projected into the gear-housing 4 of casing 1 being reduced, as at 5, to fit in a hollow boss 6 of a bearing-plate 7, rigidly secured to inner wall 8 of housing 4, such shaft being extended through a reinforced opening 9 in said wall. Immediately adjacent this opening the shaft has a pin 10 extending transversely therethrough.

12 is a sliding pinion fast on a sleeve 13, in casing, that portion of shaft 3 extended through wall 8, such sleeve itself being supported by the reinforced opening, while the pinion is additionally supported by boss 6, which projects into the axial opening thereof.

The sleeve 13 has at its inner end opposite cut-outs or recesses 14, designed to interlock with pin 10 when the pinion is moved inwardly longitudinally of the spool-shaft. It is normally so held by a spring-plate 15 whose free end is forked to straddle the pinion and engage a circumferential recess 16 formed therein. Any suitable means may be employed for unclutching the pinion from the spool-shaft, that shown comprising a sliding button 17, whose shank is extended through a narrow opening in the outer wall of the casing, such button carrying a hooked portion for moving the spring-plate in one direction, (see Fig. 6;) but, as shown in Fig. 6ª, a thickened portion 18ª may force the spring-plate in the opposite direction.

Now in order to obtain an easy-running multiple gear and at the same time have the reel-frame free from projections with which the line might become entangled I employ a crank-disk 19, mounted on the axle of a gear-wheel 20, in constant mesh with pinion 12, such disk carrying a handle 21 and fitting within a recess in the face of the casing, so as to be substantially flush with the outer wall thereof. To do this, I either bulge the periphery of the reel-casing to present an approximate pear shape, so as to have the outermost segment of the periphery of the handle-disk coincident with that of the reel-casing, as shown in Fig. 10, the reel-shaft being at the center of the casing, or I shift the spool-axle away from the center and let the edge of the handle-disk protrude beyond the circle of the casing, as shown in Fig. 1. The positioning of the handle-disk relatively to the casing may be up, down, or to either side, as shown in Figs. 7, 8, and 9, the last-mentioned figure showing the axle at the center of the circular casing. Thus it will be seen that without having any projection with which the line might become entangled I provide an easy-running multiple gear for a fishing-reel alike applicable to both fly and bait casting. The gear-wheel and pinion are always in mesh. To free the spool, as for unwinding, it is only necessary to slide the button 17, whereupon the pinion and its sleeve will be shifted sufficiently to disengage the latter from the spool-shaft. When the button is moved back again, the sleeve will reëngage the shaft. The pinion being supported not only by the spool-shaft, but also by both the hollow boss and the inner wall of the housing, its action is rendered positive and certain, and in winding torsional strain is removed from the shaft.

I claim as my invention—

1. In a fishing-reel, a spool and shaft therefor, a sliding pinion mounted on said shaft, bearings for said pinion independent of the shaft, a clutch for locking said pinion to said shaft, and an actuating gear-wheel in mesh with said pinion.

2. In a fishing-reel, a spool and shaft therefor, a sliding pinion mounted on said shaft, inner and outer bearings for said pinion independent of said shaft, a clutch for locking said pinion to said shaft, and an actuating gear-wheel in mesh with said pinion.

3. In a fishing-reel, a spool and shaft therefor, a sliding pinion having a sleeve mounted on said shaft, an inner bearing having an opening through which the shaft and sleeve extend, an outer bearing having a hollow boss into which the end of the shaft projects, said pinion also fitting on said boss, a clutch for locking said sleeve to said shaft, and an actuating gear-wheel in mesh with said pinion.

4. In a fishing-reel, a spool and shaft therefor, said shaft having a pin projecting therefrom, a sliding pinion having a cylindrical sleeve mounted on said shaft and formed with recesses or cut-outs, means for normally holding the recessed portion of such sleeve in engagement with said pin, and an actuating-gear-wheel in mesh with said pinion.

5. A fishing-reel comprising a casing, a spool and pinion therefor, a gear-wheel in mesh with said pinion, and a crank fitted against the side of said casing and carrying said gear-wheel, said crank being eccentric to said spool.

6. A fishing-reel comprising a casing, a spool and pinion therefor, a gear-wheel in mesh with said pinion and a crank-disk fitted against the side of said casing and carrying said gear-wheel, said disk being eccentric to said spool.

7. A fishing-reel having its casing formed with a recess, a spool and pinion therefor, a gear-wheel in mesh with said pinion, and a crank-disk fitted in said recess and carrying said gear-wheel, said disk being located eccentrically to the said spool.

8. A fishing-reel having its casing formed with a recess, a spool and pinion therefor, a gear-wheel in mesh with said pinion, and a crank-disk fitted in said recess and carrying said gear-wheel, said disk being located eccentrically to the said casing and to said spool.

9. A fishing-reel having a cylindrical casing formed with a recess in one end, a spool mounted eccentrically to said casing and having a gear-pinion, a gear-wheel in mesh with said pinion, a disk fitted in said recess carrying said gear-wheel, said disk being located eccentrically to said casing, and a handle carried by said disk, as set forth.

10. A fishing-reel comprising a spool, and shaft therefor having a laterally-extended pin, a pinion and sleeve fitted on said shaft, bearings for said pinion and sleeve independently of said shaft, means engaging said pinion for normally holding said sleeve in locked relation to the pin on said shaft, a device for disengaging said sleeve from said pin, a gear-wheel, and a crank-disk for actuating the latter, as set forth.

11. A fishing-reel comprising a casing, a spool and shaft therefor, a pinion normally held locked to said shaft, a gear-wheel with which said pinion meshes, a plate engaging said pinion for locking it to and unlocking it from said shaft, and a sliding button having a hooked portion and a thickened portion for alternately engaging said plate for moving it in opposite directions.

In testimony whereof I have signed this specification in the presence of two subscribing witnesses.

GEORGE W. UPTON.

Witnesses:
H. T. UPTON,
HOMER E. STEWART.